(12) United States Patent
Hashimoto et al.

(10) Patent No.: US 9,263,742 B2
(45) Date of Patent: Feb. 16, 2016

(54) NEGATIVE ELECTRODE ACTIVE SUBSTANCE FOR LITHIUM SECONDARY BATTERY AND METHOD FOR PRODUCING SAME

(75) Inventors: Daisuke Hashimoto, Oyama (JP); Koji Hisayuki, Oyama (JP)

(73) Assignee: Showa Denko K.K., Tokyo (JP)

( * ) Notice: Subject to any disclaimer, the term of this patent is extended or adjusted under 35 U.S.C. 154(b) by 434 days.

(21) Appl. No.: 14/110,507

(22) PCT Filed: Nov. 25, 2011

(86) PCT No.: PCT/JP2011/077165
§ 371 (c)(1),
(2), (4) Date: Jan. 8, 2014

(87) PCT Pub. No.: WO2012/073815
PCT Pub. Date: Jun. 7, 2012

(65) Prior Publication Data
US 2014/0113189 A1    Apr. 24, 2014

(30) Foreign Application Priority Data

Nov. 30, 2010 (JP) .................. 2010-266565

(51) Int. Cl.
| | |
|---|---|
| *H01M 4/46* | (2006.01) |
| *H01M 4/134* | (2010.01) |
| *H01M 4/1395* | (2010.01) |
| *B02C 23/06* | (2006.01) |
| *H01M 4/36* | (2006.01) |
| *H01M 10/052* | (2010.01) |
| *H01M 4/62* | (2006.01) |

(52) U.S. Cl.
CPC ............... *H01M 4/463* (2013.01); *B02C 23/06* (2013.01); *H01M 4/134* (2013.01); *H01M 4/1395* (2013.01); *H01M 4/36* (2013.01); *H01M 10/052* (2013.01); *H01M 4/621* (2013.01); *H01M 4/624* (2013.01); *Y02E 60/122* (2013.01)

(58) Field of Classification Search
CPC ... H01M 4/463; H01M 4/134; H01M 4/1395; H01M 4/36; H01M 4/621; H01M 4/624
See application file for complete search history.

(56) References Cited

U.S. PATENT DOCUMENTS 5,998,063 A    12/1999    Kobayashi et al.

FOREIGN PATENT DOCUMENTS

| JP | 03-252052 A | 11/1991 |
|---|---|---|
| JP | 08-213053 A | 8/1996 |
| JP | 2001-297757 A | 10/2001 |
| JP | 2005-078999 A | 3/2005 |
| JP | 2010-170901 A | 8/2010 |

OTHER PUBLICATIONS

N. Kumagai et al., "Cycling behaviour of lithium-aluminium alloys formed on various aluminium substrates as negative electrodes in secondary lithium cells," Journal of Applied Electrochemistry 22, 1992, pp. 620-627.
International Search Report dated Feb. 7, 2012, issued for PCT/JP2011/077165.

*Primary Examiner* — Helen O Conley
(74) *Attorney, Agent, or Firm* — Locke Lord LLP

(57) ABSTRACT

The present invention provides an anode material for a lithium secondary battery, which material realizes prolongation of the cycle life of a lithium secondary battery. The present invention relates to an anode active material for a lithium secondary battery, the active material containing a powder produced by a step of forming an etched foil through etching of both surfaces of a foil of Al having a purity of 90 mass % or higher, and a step of shredding the etched foil, the steps being carried out in this order.

9 Claims, 2 Drawing Sheets

NEGATIVE ELECTRODE ACTIVE SUBSTANCE FOR LITHIUM SECONDARY BATTERY AND METHOD FOR PRODUCING SAME

TECHNICAL FIELD

The present invention relates to a negative electrode (i.e., an anode) active material for a lithium secondary battery, and to a method for producing the anode active material. More particularly, the present invention relates to an anode active material for a non-aqueous electrolyte secondary battery, which material can reversibly occlude and release a large amount of Li ions; and to a method for producing the anode active material. As used herein, the term "non-aqueous electrolyte secondary battery" encompasses a secondary battery containing a non-aqueous electrolyte (i.e., an electrolyte dissolved in an organic solvent), and a secondary battery containing a non-aqueous electrolyte such as a polymer electrolyte or a gel electrolyte.

BACKGROUND ART

Lithium secondary batteries (e.g., a lithium ion battery and a lithium polymer battery), which have a high energy density, have been used as a main power supply for, for example, mobile communication devices or portable electronic devices. In addition, such a lithium secondary battery has become of interest as a large-scale power supply for electricity storage or a vehicle power supply.

Hitherto, the anode of such a lithium secondary battery has generally been formed of any carbon material, such as graphite or low-crystallinity carbon. However, the anode formed of such a carbon material exhibits low available current density and insufficient theoretical capacity. For example, graphite, which is a type of carbon material, has a theoretical capacity as low as 372 mAh/g. Thus, demand has arisen for development of an anode having a higher capacity.

Meanwhile, as has been known, when an anode formed of metallic Li is employed in a lithium secondary battery, high theoretical capacity is achieved. However, such a battery poses a critical problem in that dendritic metallic Li is deposited on the anode during charging, and the dendrite is grown through repeated charging/discharging and reaches the positive electrode (i.e., a cathode), resulting in internal short-circuit. In addition, since the thus-deposited dendritic metallic Li has large specific surface area and thus high reaction activity, an interfacial film is formed on the surface of the dendrite from a decomposition product of a solvent having no electron conductivity, whereby the internal resistance of the battery increases, resulting in reduction of charging/discharging efficiency. Thus, a lithium secondary battery including an anode formed of metallic Li exhibits low reliability and has short cycle life. Therefore, such a lithium secondary battery has not been widely put into practice.

Under these circumstances, demand has arisen for an anode active material formed of a material, other than metallic Li, which has a discharge capacity greater than that of a generally used carbon material. As has been known, for example, an element such as Sn, Si, or Ag, or a nitride or oxide of such an element can occlude Li ions and can form an alloy with Li ions, and the amount of Li ions occluded therein is considerably greater than that of Li ions occluded in any carbon material.

However, in the case where an anode formed of, for example, an element such as Sn, Si, or Ag, or a nitride or oxide of such an element is employed in a lithium secondary battery, when the battery is subjected to repeated charging/discharging cycles, considerable expansion and contraction of the anode may occur in association with occlusion and release of Li ions, and the expansion and contraction may cause cracking or disintegration of the anode. Therefore, a lithium secondary battery including an anode formed of the aforementioned substance (e.g., an element such as Sn, Si, or Ag, or a nitride or oxide of such an element) exhibits reduced cycle life, and thus cannot be used as a practical battery.

In order to solve such a problem, there has been proposed an anode active material formed of an alloy having two or more phases, the alloy containing a metal which is likely to occlude and release Li ions, and a metal which neither occludes nor releases Li ions, wherein the latter metal is incorporated for the purpose of preventing expansion and contraction of the anode during occlusion and release of Li ions, as well as cracking or disintegration of the anode caused by expansion and contraction of the anode.

For example, Patent Document 1 describes an anode active material containing an Li-ion-occluding phase $\alpha$, and a phase $\beta$ formed of an intermetallic compound or solid solution of an element forming the Li-ion-occluding phase $\alpha$ and another element, the anode active material having a structure produced by rapid solidification of a molten raw material having a selected composition through, for example, the atomization method or the chill roll method. Meanwhile, Patent Document 2 describes an anode active material formed of composite powder produced by mixing the following raw materials: component A, which is at least one element selected from the group consisting of Ag, Al, Au, Ca, Cu, Fe, In, Mg, Pd, Pt, Y, Zn, Ti, V, Cr, Mn, Co, Ni, Y, Zr, Nb, Mo, Hf, Ta, W, and rare earth elements, and component B, which is at least one element selected from the group consisting of Ga, Ge, Sb, Si, and Sn, and by subjecting the resultant mixture to mechanical alloying treatment.

Although an anode formed from the anode active material described in Patent Document 1 or 2 exhibits high initial discharge capacity, there cannot be effectively prevented expansion and contraction of the anode through repeated charging/discharging, as well as cracking or disintegration of the anode caused by expansion and contraction of the anode. Thus, the anode active material has not yet realized prolongation of the cycle life of a lithium secondary battery.

PRIOR ART DOCUMENT

Patent Document

Patent Document 1: Japanese Patent Application Laid-Open (kokai) No. 2001-297757
Patent Document 2: Japanese Patent Application Laid-Open (kokai) No. 2005-78999

SUMMARY OF THE INVENTION

Problems to be Solved by the Invention

In order to solve the aforementioned problems, an object of the present invention is to provide an anode active material for a lithium secondary battery, which material occludes and releases a large amount of Li ions and thus exhibits high charge/discharge capacity, which suppresses a reduction in capacity caused by repeated charging/discharging, and which realizes prolongation of the cycle life of a lithium secondary battery. Another object of the present invention is to provide a method for producing the anode active material.

Means for Solving the Problems

In order to achieve the aforementioned objects, the prevent invention provides the following.

1) An anode active material for a lithium secondary battery, the active material comprising a powder produced by a step of forming an etched foil through etching of both surfaces of a foil of Al having a purity of 90 mass % or higher, and a step of shredding the etched foil, the steps being carried out in this order.

2) An anode active material for a lithium secondary battery according to 1) above, wherein the powder produced through shredding of the etched foil contains a particle having a plurality of pores which are open on the surface of the particle and which have a pore size of 0.5 µm or more; and the sum of the opening areas of the pores which are open on the surface of the particle is 10% or more of the surface area of the particle.

3) An anode active material for a lithium secondary battery according to 2) above, wherein each particle of the powder has a particle size of 5 to 150 µm, and each pore-containing particle has a pore size of 0.5 to 15 µm and a ratio of the pore size to the particle size (pore size/particle size) of less than 0.1.

4) An anode active material for a lithium secondary battery according to 1) above, wherein, among all pores, formed through etching, of the etched foil (hereinafter the pores may be referred to as "etching pores"), at least some of the etching pores are through pores.

5) A method for producing an anode active material for a lithium secondary battery, the method being characterized by comprising forming an etched foil having on both surfaces thereof porous layers through etching of both surfaces of a foil of Al having a purity of 90 mass % or higher; and shredding the etched foil, to thereby form a powder.

6) A method for producing an anode active material for a lithium secondary battery according to 5) above, wherein the etched foil has a thickness of 200 µm or less; each etching pore of both the porous layers has a pore size of 0.5 to 15 µm; the sum of the opening areas of all etching pores of both the porous layers is 10% or more of the total area of both surfaces of the etched foil; and at least some of all the etching pores of the etched foil are through pores.

7) A method for producing an anode active material for a lithium secondary battery according to 6) above, wherein the etched foil has a thickness of 50 to 150 µm.

8) An anode for a lithium secondary battery, the anode comprising a collector, and a mixture which contains an anode active material as recited in 1) above, a conductive aid, and a binder, and which is deposited on the collector.

9) A lithium secondary battery comprising an anode as recited in 8) above, a separator, and a cathode for a lithium secondary battery.

Effects of the Invention

The anode active material for a lithium secondary battery (hereinafter may be referred to as "lithium secondary battery anode active material") described above in any of 1) to 4) contains a powder produced by a step of forming an etched foil through etching of both surfaces of a foil of Al having a purity of 90 mass % or higher, and a step of shredding the etched foil, the steps being carried out in this order. Thus, the powder produced through shredding of the etched foil contains a particle having a plurality of pores which are open on the surface of the particle. Therefore, a change in volume of the anode active material is suppressed during charging/discharging, and cracking or disintegration of the anode active material, which would otherwise be caused by a considerable change in volume of the active material during charging/discharging, can be effectively prevented, along with removal of the anode active material from a conductive aid or a binder. In addition, conceivably, a reduction in capacity caused by repeated charging/discharging is suppressed, and the cycle life of a lithium secondary battery including an anode formed of the anode active material can be prolonged. The reason for this is considered to be as follows. Specifically, in a lithium secondary battery including an anode formed of the anode active material described above in any of 1) to 4), during charging, Li ions enter pores of particles to thereby form an Li-ion-containing compound in the pores, and Li ions also enter gaps between particles of the powder of the anode active material to thereby form an Li-ion-containing compound in the gaps, whereby expansion of the anode active material during charging can be suppressed. Also, contraction of the anode active material is suppressed during discharging (i.e., during release of Li ions from the anode active material). Conceivably, these phenomena lead to suppression of a change in volume of the anode active material during charging/discharging.

In addition, a lithium secondary battery including an anode formed of the anode active material described above in any of 1) to 4) can occlude and release a larger amount of Li ions, and exhibits higher charge/discharge capacity, as compared with the case of a lithium secondary battery including an anode formed of an anode active material containing any carbon material.

When the anode of a lithium secondary battery is formed from the lithium secondary battery anode active material described above in any of 2) to 4), a change in volume of the anode during charging/discharging of the lithium secondary battery can be further effectively suppressed.

According to the method described above in 5), a lithium secondary battery anode active material can be readily produced, since the method only includes the steps of forming an etched foil having on both surfaces thereof porous layers through etching of both surfaces of a foil of Al having a purity of 90 mass % or higher, and shredding the etched foil.

According to the method described above in 6) or 7), the anode active material described above in any of 2) to 4) can be readily produced.

The anode described above in 8) or the lithium secondary battery described above in 9) exhibits remarkable effects similar to those obtained by the anode active material described above in any of 1) to 4).

Figure 1:
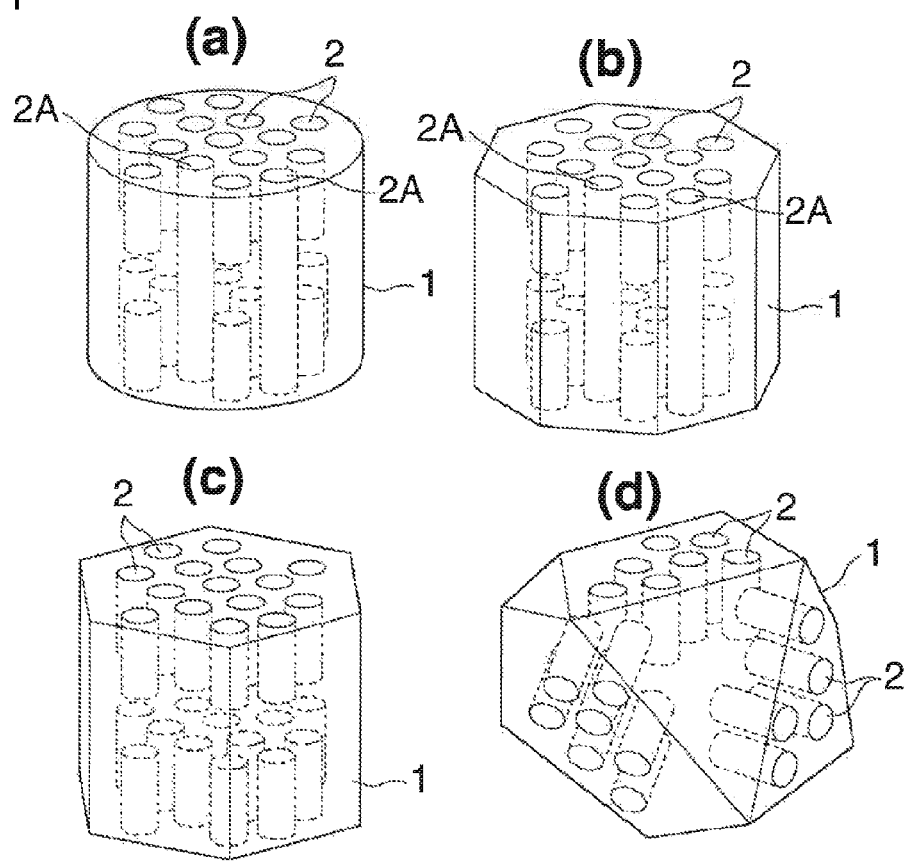
FIG. 1 is an enlarged perspective view of particles of the lithium secondary battery anode active material of the present invention.

DESCRIPTION OF REFERENCE NUMERALS (1): particle
(2): pore (10): lithium secondary battery
(12): anode
(13): cathode
(14): separator

MODES FOR CARRYING OUT THE INVENTION

An embodiment of the present invention will next be described with reference to the drawings.

Figure 2:
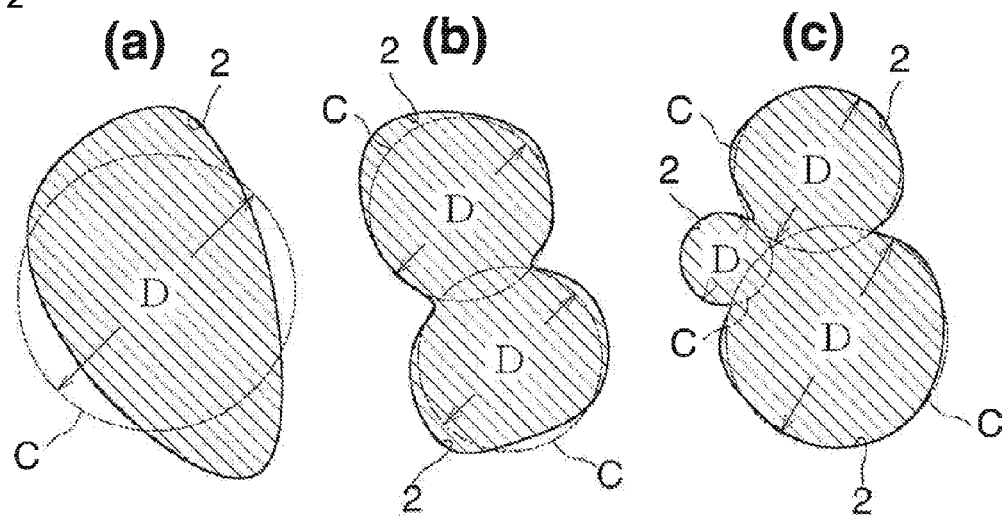
FIG. 2 illustrates pore sizes of the particles of the lithium secondary battery anode active material shown in FIG. 1.
Figure 3:
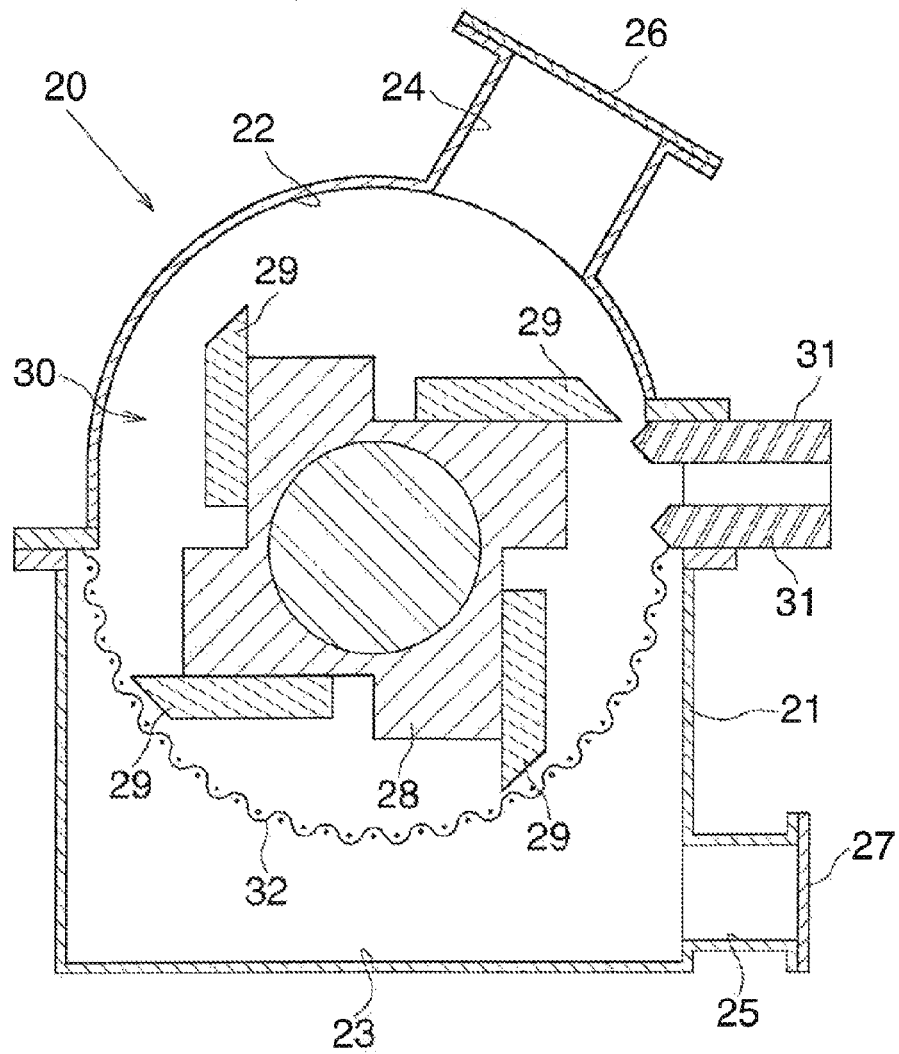
FIG. 3 is a schematic vertical cross-sectional view of an apparatus for producing a powder of a lithium secondary battery anode active material through shredding of an etched foil.
Figure 4:
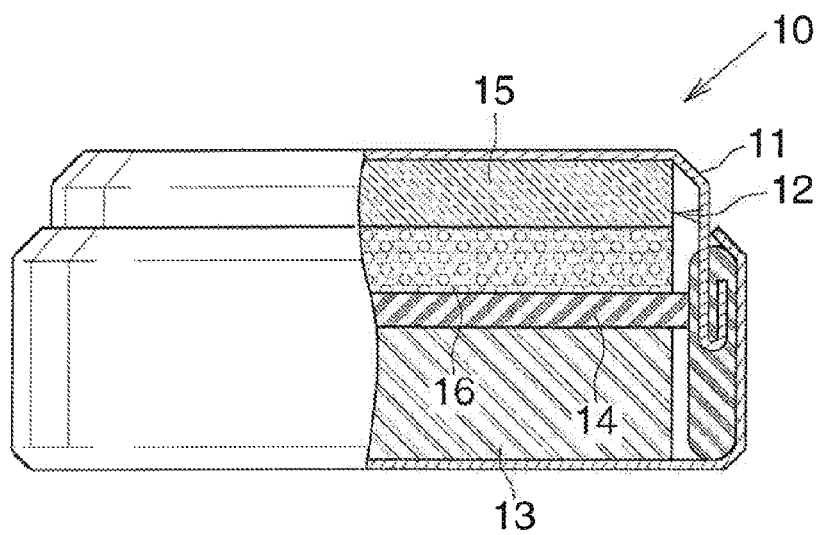
FIG. 4 is a partially cutaway front view of a lithium secondary battery including an anode formed of the lithium secondary battery anode active material shown in FIG. 1.

FIG. 1 shows particles forming the lithium secondary battery anode active material of the present invention. FIG. 2 shows pores formed in the particles of the lithium secondary battery anode active material shown in FIG. 1. FIG. 3 shows an apparatus for producing a powder of the lithium secondary battery anode active material shown in FIG. 1 through shredding of an etched foil. FIG. 4 shows an example of a lithium secondary battery including an anode formed of the lithium secondary battery anode active material shown in FIG. 1.

The lithium secondary battery anode active material contains a powder produced by a step of forming an etched foil through etching of both surfaces of a foil of Al having a purity of 90 mass % or higher, and a step of shredding the etched foil, the steps being carried out in this order. As used herein, the term "foil" refers to a product having a thickness of 0.006 to 0.2 mm as specified by JIS, and the term "powder" refers to an aggregate of particles having a maximum size of 1 mm or less as specified by JIS Z2500.

The powder forming the lithium secondary battery anode active material may contain particles having various shapes. Preferably, as shown in FIG. 1, the powder contains a particle (1) having a plurality of pores (2) which are open on the surface of the particle and which have a pore size of 0.5 μm or more. This is because, when the pore size is less than 0.5 μm, Li ions may fail to reach the interior of the pores (2), and the amount of Li ions occluded therein may be reduced. The maximum pore size of the pores (2) of the particle (1) is preferably 15 m for the following reasons. The particle size of the particle (1) must be increased to more than 150 μm for formation of the pores (2) having a pore size of 15 μm. In such a case, when the anode active material is mixed with a conductive aid and a binder for producing an anode, the resultant mixture may fail to be in an appropriate paste state, and difficulty may be encountered in coating a collector with the mixture. Preferably, the sum of the opening areas of all the pores (2) which are open on the surface of each particle (1) is 10% or more of the surface area of the particle (1) having the pores (2). This is because, when the sum of the opening areas of all the pores (2) which are open on the surface of each particle (1) is less than 10% of the surface area of the particle (1) having the pores (2), the amount of Li ions occluded in the pores (2) may be reduced. In the particle having the pores (2), at least some of the pores (i.e., pores (2A)) may be through pores.

Each particle (1) preferably has a particle size of 5 to 150 μm. In the case where the particle size exceeds 150 μm, when the anode active material is mixed with a conductive aid and a binder for producing an anode, the resultant mixture may fail to be in an appropriate paste state, and difficulty may be encountered in coating a collector with the mixture. Meanwhile, when the particle (1) having the pores (2) has a particle size of less than 5 μm, the pores (2) having a pore size of 0.5 μm or more may fail to be formed. In the particle (1) having the pores (2), the ratio of the pore size to the particle size (i.e., pore size/particle size) is preferably less than 0.1.

In many cases, the pores (2) which are open on the surface of the particle (1) do not have a circular shape. Therefore, as shown in FIG. 2(a), the term "pore size" of a pore (2) refers to the circle-equivalent diameter of the pore (2); i.e., the diameter (D) of a circle (C) having the same area as that of the pore (2). In some cases, a plurality of pores (2) are bonded together in a certain particle. In such a case, as shown in FIGS. 2(b) and 2(c), the "pore size" of each of the bonded pores (2) refers to the circle-equivalent diameter of the pore (2); i.e., the diameter (D) of a circle (C) having the same area as that of the pore (2).

The powder forming the lithium secondary battery anode active material may contain a particle having no pores.

In the present invention, the etched foil employed for producing the anode active material is limited to an etched foil formed through etching of both surfaces of a foil of Al having a purity of 90 mass % or higher, for the purpose of increasing the amount of Li ions occluded in or released from an anode formed of the anode active material. Particularly preferably, the etched foil is formed of Al having a purity of 99.9 mass % or more. In such a case, the initial charge/discharge capacity of a lithium secondary battery including an anode formed of the anode active material can be increased, and a reduction in capacity caused by repeated charging/discharging can be suppressed.

Both surfaces of the etched foil employed for producing the anode active material have been subjected to etching; i.e., each surface of the etched foil has a porous layer formed thereon. Each etching pore formed in the porous layer of the etched foil preferably has a pore size of 0.5 to 15 μm, more preferably 0.5 to 5 μm. In many cases, etching pores which are open on the surface of the etched foil do not have a circular shape. Therefore, as in the case of the aforementioned particle (1), the term "pore size" of an etching pore refers to the circle-equivalent diameter of the etching pore; i.e., the diameter of a circle having the same area as that of the etching pore. In some cases, a plurality of etching pores are bonded together in a porous layer of the etched foil. In such a case, the "pore size" of each of the bonded etching pores refers to the circle-equivalent diameter of the etching pore; i.e., the diameter of a circle having the same area as that of the etching pore. No particular limitation is imposed on the depth of each etching pore of the etched foil. Preferably, at least some of all the etching pores are through pores; i.e., pores penetrating through the etched foil. Preferably, the sum of the opening areas of all the etching pores which are open on both surfaces of the etched foil is 10% or more of the total area of both surfaces of the etched foil. When the etched foil satisfies these conditions, powder particles formed through shredding of the etched foil satisfy the aforementioned conditions. Preferably, the etched foil has a thickness of 200 μm or less. When the thickness of the etched foil exceeds 200 μm, difficulty is encountered in shredding the foil. More preferably, the etched foil has a thickness of 50 to 150 μm. In such a case, the particle (1) having the aforementioned particle size is produced with excellent efficiency.

The conditions regarding the etched foil (e.g., the pore size of etching pores of the etched foil, and the ratio of the sum of the opening areas of all etching pores to the surface area of the etched foil) are determined from the viewpoints of the amount of Li ions occluded in pores of powder particles produced through shredding of the etched foil, and suppression of expansion of an anode formed of the anode active material during charging of a lithium secondary battery including the anode, or contraction of the anode during discharging of the lithium secondary battery.

The etched foil employed in the present invention may be, for example, a commercially available electrode foil for aluminum electrolytic capacitor which satisfies the aforementioned conditions. Since an anodic oxide film is formed on an etched foil for aluminum electrolytic capacitor in association with the voltage applied thereto, the pore size of pores of the etched foil is determined so that the pores are not plugged by the anodic oxide film. Therefore, all etched foils for aluminum electrolytic capacitor—whose intended use differs from that of the etched foil employed for producing the anode active material of the present invention—do not satisfy the aforementioned conditions (e.g., the pore size of pores of the etched foil, and the opening areas of etching pores). However, some etched foils for aluminum electrolytic capacitor satisfy the conditions of the etched foil required for producing a powder of the anode active material of the present invention (i.e., the thickness of the etched foil, the pore size of etching pores of the etched foil, and the ratio of the sum of the opening areas of all etching pores, which are open on the surface of the etched foil, to the surface area of the etched foil).

The etched foil employed for producing the anode active material may be produced through, for example, a method including a first etching treatment step of subjecting both surfaces of an Al foil having a purity of 90 mass % or higher (preferably a purity of 99.9 mass % or more, more preferably a purity of 99.99 mass % or more) in which the ratio of crystal grains having a (100) plane to all the crystal grains is 70% or more (preferably 90% or more, more preferably 95% or more) to direct current etching in an aqueous solution containing hydrochloric acid (2 to 15 mass %) and at least one acid selected from the group consisting of sulfuric acid, oxalic acid, and phosphoric acid (0.01 to 5 mass %); an intermediate treatment step of electrochemically or chemically forming a surface oxide film in an aqueous solution containing $NH_4^+$ or $Na^+$ (this step is carried out once or more); and a second etching treatment step of performing direct current etching in an aqueous solution containing at least one neutral salt selected from among $Cl^-$-containing neutral salts (e.g., sodium chloride, ammonium chloride, and potassium chloride) (0.1 to 10 mass %), so that the resultant etched foil satisfies the aforementioned conditions (e.g., the pore size of etching pores of the etched foil, and the ratio of the sum of the opening areas of all etching pores, which are open on the surface of the etched foil, to the surface area of the etched foil).

When the Al foil employed for forming the etched foil has a low purity, a surface portion of the foil dissolves in the solution during etching, and desired etching pores are difficult to form. Therefore, as described above, the Al foil employed preferably has a higher purity. Similarly, when, in the Al foil employed for forming the etched foil, the ratio of crystal grains having a (100) plane to all the crystal grains is low, a surface portion of the foil dissolves in the solution during etching, and desired etching pores are difficult to form. Therefore, as described above, the ratio of crystal grains having a (100) plane to all the crystal grains is preferably high in the Al foil employed.

The aforementioned Al foil purity is determined as specified by JIS H4170; i.e., determined by subtracting the total amount of Fe, Si, and Cu from 100 mass %.

The method for forming the etched foil is not limited to direct current etching, so long as specific etching pores are formed. That is, the etched foil may be formed through alternate current etching or chemical etching. Alternatively, the etched foil may be formed through a method in which at least two of these three etching processes are carried out in combination in an appropriate order.

The etched foil employed for producing the anode active material is preferably a foil whose surface has not undergone chemical conversion treatment.

Production of powder from the etched foil is preferably carried out through a method in which the foil is shredded by means of a blade. In contrast, production of powder through tearing or slamming of the etched foil is not preferred, since openings on the surfaces of the resultant powder particles may be closed. Shredding of the etched foil may be carried out through a method employing an apparatus including a movable blade and a fixed blade, in which the etched foil is shredded by the fixed blade in combination with the movable blade rotated at high speed. In this case, a screen having numerous sieve openings is placed below the movable blade and the fixed blade, and the size of the sieve openings is appropriately adjusted so that powder particles formed through shredding of the etched foil and having a particle size of 5 to 150 μm can pass through the sieve openings of the screen.

FIG. 3 schematically shows a specific example of an apparatus for shredding an etched foil.

The housing (21) of the shredding apparatus (20) includes a shredding chamber (22), and a powder collection chamber (23) located below the shredding chamber (22). The housing (21) has an etched foil feed inlet (24) provided on the shredding chamber (22), and a powder removal outlet (25) provided on the powder collection chamber (23). The inlet (24) and the outlet (25) can be respectively opened/closed by means of lids (26) and (27) which are detachably provided on the housing (21).

The shredding chamber (22) of the housing (21) of the shredding apparatus (20) includes therein a rotary cutting machine (30) having a rotary body (28), and a plurality of rotary blades (29) which are attached to the rotary body (28) at intervals in the rotation direction of the rotary body (28). The housing (21) also includes therein a plurality of fixed blades (31) such that tip ends thereof are located in the interior of the shredding chamber (22). When the rotary body (28) is rotated, an etched foil fed to the apparatus is shredded by means of the rotary blades (29) and the fixed blades (31).

A screen (32) having a plurality of sieve openings is provided between the shredding chamber (22) and the powder collection chamber (23) in the housing (21) of the shredding apparatus (20). The size of the sieve openings of the screen (32) is adjusted so that only particles having a particle size of 150 μm or less can pass through the sieve openings.

After feeding of an etched foil through the feed inlet (24) of this shredding apparatus, when the feed inlet is closed by the lid (26) and the rotary body (28) is rotated, the etched foil is shredded by means of the rotary blades (29) and the fixed blades (31) until the resultant particles can pass through the sieve openings of the screen (32). Then, particles having a particle size of 150 μm or less pass through the sieve openings of the screen (32) and enter the powder collection chamber (23). Thereafter, the lid (27) is opened, and powder containing particles having a particle size of 150 μm or less is removed from the powder collection chamber (23). Thus, the anode active material is produced.

As shown in FIG. 4, the anode active material is employed in, for example, a coin-type lithium secondary battery (10). The coin-type lithium secondary battery (10) includes, in a casing (11), an anode (12); a cathode (13) provided so as to face the anode (12); a separator (14) sandwiched between the anode (12) and the cathode (13); and a non-aqueous electrolyte (not illustrated).

The anode (12) is formed by depositing, on a collector (15), a mixture (16) containing the anode active material, a conductive aid, and a binder. The collector (15) employed may be, for example, a copper foil such as rolled copper foil or electrolytic copper foil. The conductive aid employed may be, for example, Ketjen black or acetylene black, but is not limited thereto. The binder employed may be polyvinylidene fluoride, but is not limited thereto.

The cathode (13) employed may be, for example, an electrode formed by depositing, on a collector formed of aluminum foil, a mixture of $LiCoO_2$ (serving as an active material), a conductive aid, and a binder, but is not limited thereto.

In the aforementioned lithium secondary battery (10), during charging, Li ions enter the pores (2) of the particles (1) of the anode active material contained in the anode (12), to thereby form an Li-ion-containing compound in the pores (2), and Li ions also enter gaps between the particles (1) of the anode active material, to thereby form an Li-ion-containing compound in the gaps, whereby expansion of the particles (1) of the anode active material during charging can be suppressed. Since the expansion during charging is suppressed, contraction of the particles (1) of the anode active material is suppressed during discharging (i.e., during release of Li ions from the particles (1)). Therefore, a change in volume of the particles (1) of the anode active material is suppressed during charging/discharging, and cracking or disintegration of the particles (1), which would otherwise be caused by a considerable change in volume of the particles (1) of the anode active material during charging/discharging, can be effectively prevented, along with removal of the particles (1) of the anode active material from the conductive aid or the binder. Also, a reduction in capacity caused by repeated charging/discharging is suppressed, and the cycle life of the lithium secondary battery (10) can be prolonged.

In addition, the initial charge/discharge capacity of the lithium secondary battery (10) is increased, and a reduction in capacity caused by repeated charging/discharging is suppressed.

In the aforementioned embodiment, the anode active material of the present invention is employed in a coin-type lithium secondary battery. However, application of the anode active material is not limited thereto, and the anode active material may be applied to a known lithium secondary battery such as a rectangular, cylindrical, or laminate-type lithium secondary battery.

Next will be described a specific example of the present invention and a comparative example.

EXAMPLE

A commercially available Al foil (both surfaces thereof had undergone etching) for middle- or high-voltage (170 V or more) electrolytic capacitor anode was shredded by means of a shredder, and then further pulverized by means of a pulverizer, to thereby produce a powdery anode active material. The resultant anode active material was found to contain particles having a particle size of 1 to 50 µm. Particles of the anode active material were observed under an electron microscope. As a result, the particles were found to have pores whose presence had been determined in the foil.

Subsequently, the anode active material (85 parts by weight) was mixed with polyvinylidene fluoride serving as a binder (8 parts by weight) and acetylene black serving as a conductive aid (7 parts by weight), and the resultant mixture was applied to a collector formed of copper foil (thickness: 10 µm). Then, an anode was formed through punching of the mixture-applied collector by means of a circular punch (1 cm$^2$). A cathode formed of metallic Li was provided, and a separator formed of polyethylene having a micropore structure (porosity: 40 vol. %) was sandwiched between the cathode and the anode. There was provided, as an electrolyte, a solution prepared by dissolving $LiPF_6$ (1 mol/L) in a solvent mixture of ethylene carbonate (EC) and dimethyl carbonate (DMC) (EC:DMC=1:1 by volume). A coin-type model battery (CR2032 type) was produced from these components in a dry box in an atmosphere having a dew point of −50° C. or lower.

Comparative Example

A high-purity annealed Al foil (purity: 99.99 mass %) was shredded by means of a shredder, and then further pulverized by means of a pulverizer, to thereby produce a powdery anode active material. The resultant anode active material was found to contain particles having a particle size of 1 to 50 µm.

Subsequently, the anode active material (85 parts by weight) was mixed with polyvinylidene fluoride serving as a binder (8 parts by weight) and acetylene black serving as a conductive aid (7 parts by weight), and the resultant mixture was applied to a collector formed of copper foil (thickness: 10 µm). Then, an anode was formed through punching of the mixture-applied collector by means of a circular punch (1 cm$^2$). A cathode formed of metallic Li was provided, and a separator formed of polyethylene having a micropore structure (porosity: 40 vol. %) was sandwiched between the cathode and the anode. There was provided, as an electrolyte, a solution prepared by dissolving $LiPF_6$ (1 mol/L) in a solvent mixture of ethylene carbonate (EC) and dimethyl carbonate (DMC) (EC:DMC=1:1 by volume). A coin-type model battery (CR2032 type) was produced from these components in a dry box in an atmosphere having a dew point of −50° C. or lower.

Evaluation Test

The anode of each of the model batteries produced in the Example and the Comparative Example was evaluated through the following method.

Each model battery was subjected to repeated charging/discharging cycles, each cycle consisting of constant-current charging at 0.2 mA/cm$^2$ until attainment of 1 V, followed by 10 minutes rest, and then constant-current discharging at 0.2 mA/cm$^2$ until attainment of 0 V. The discharge capacity of the model battery was determined after a specific number of cycles.

Table 1 shows the evaluation results of the model batteries produced in the Example and the Comparative Example (the number of cycles, and the discharge capacity corresponding thereto).

TABLE 1

| | Discharge capacity (mAh/g) | | |
|---|---|---|---|
| | After 1 cycle | After 20 cycles | After 100 cycles |
| Example | 652 | 502 | 398 |
| Comparative Example | 154 | 63 | 15 |

As is clear from Table 1, the model battery produced in the Example exhibited an initial discharge capacity higher than that of the model battery produced in the Comparative Example, and the discharge capacity of the model battery of the Example was maintained at a sufficient level even after 100 cycles (i.e., a reduction in discharge capacity was suppressed). Thus, the cycle life of the model battery produced in the Example was prolonged, as compared with the case of the model battery produced in the Comparative Example.

INDUSTRIAL APPLICABILITY

The lithium secondary battery anode active material of the present invention is suitable for use in an anode of a lithium secondary battery, and realizes prolongation of the cycle life of the lithium secondary battery.

The invention claimed is:

1. An anode active material for a lithium secondary battery, the active material comprising a powder produced by a step of forming an etched foil through etching of both surfaces of a foil of Al having a purity of 90 mass % or higher, and a step of shredding the etched foil, the steps being carried out in this order.

2. An anode active material for a lithium secondary battery according to claim 1, wherein the powder produced through shredding of the etched foil contains a particle having a plurality of pores which are open on the surface of the particle and which have a pore size of 0.5 μm or more; and the sum of the opening areas of the pores which are open on the surface of the particle is 10% or more of the surface area of the particle.

3. An anode active material for a lithium secondary battery according to claim 2, wherein each particle of the powder has a particle size of 5 to 150 μm, and each pore-containing particle has a pore size of 0.5 to 15 μm and a ratio of the pore size to the particle size (pore size/particle size) is less than 0.1.

4. An anode active material for a lithium secondary battery according to claim 1, wherein, among all etching pores of the etched foil, at least some of the etching pores are through pores.

5. A method for producing an anode active material for a lithium secondary battery, the method being characterized by comprising forming an etched foil having on both surfaces thereof porous layers through etching of both surfaces of a foil of Al having a purity of 90 mass % or higher; and shredding the etched foil, to thereby form a powder.

6. A method for producing an anode active material for a lithium secondary battery according to claim 5, wherein the etched foil has a thickness of 200 μm or less; each etching pore of both the porous layers has a pore size of 0.5 to 15 μm; the sum of the opening areas of all etching pores of both the porous layers is 10% or more of the total area of both surfaces of the etched foil; and at least some of all the etching pores of the etched foil are through pores.

7. A method for producing an anode active material for a lithium secondary battery according to claim 6, wherein the etched foil has a thickness of 50 to 150 μm.

8. An anode for a lithium secondary battery, the anode comprising a collector, and a mixture which contains an anode active material as recited in claim 1, a conductive aid, and a binder, and which is deposited on the collector.

9. A lithium secondary battery comprising an anode as recited in claim 8, a separator, and a cathode for a lithium secondary battery.

\* \* \* \* \*